Figure 7:
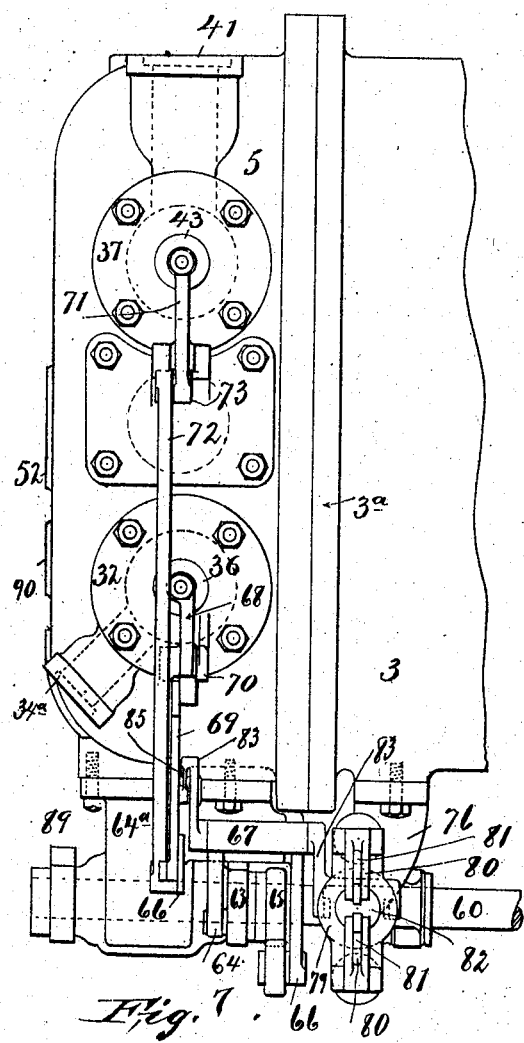

No. 796,106. PATENTED AUG. 1, 1905.
J. L. BOGERT.
INTERNAL COMBUSTION HEAT ENGINE.
APPLICATION FILED JAN. 19, 1897.
6 SHEETS—SHEET 1.
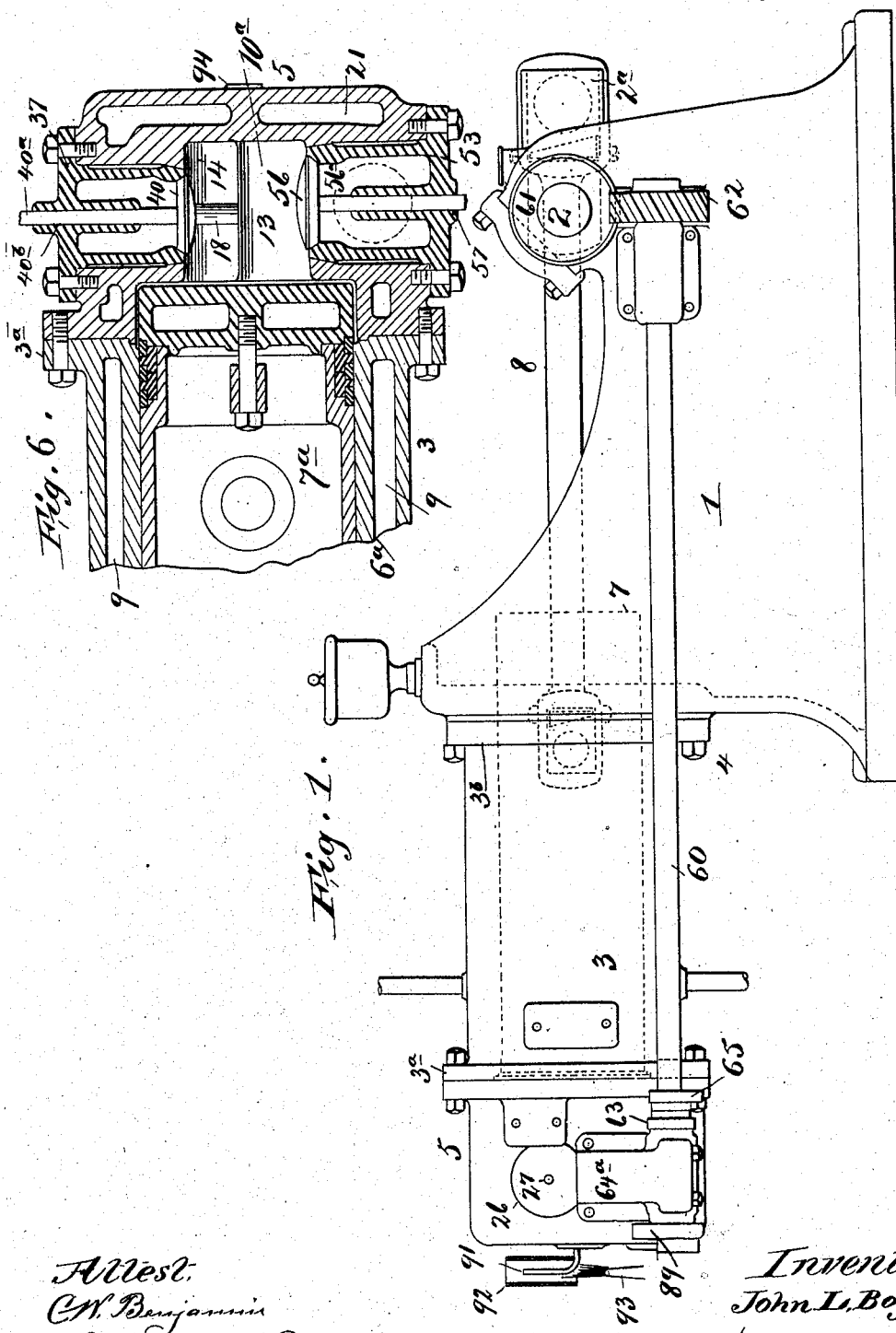
Attest:
C. W. Benjamin
Joseph L. Levy
Inventor:
John L. Bogert,
by T. F. Bourne
his atty

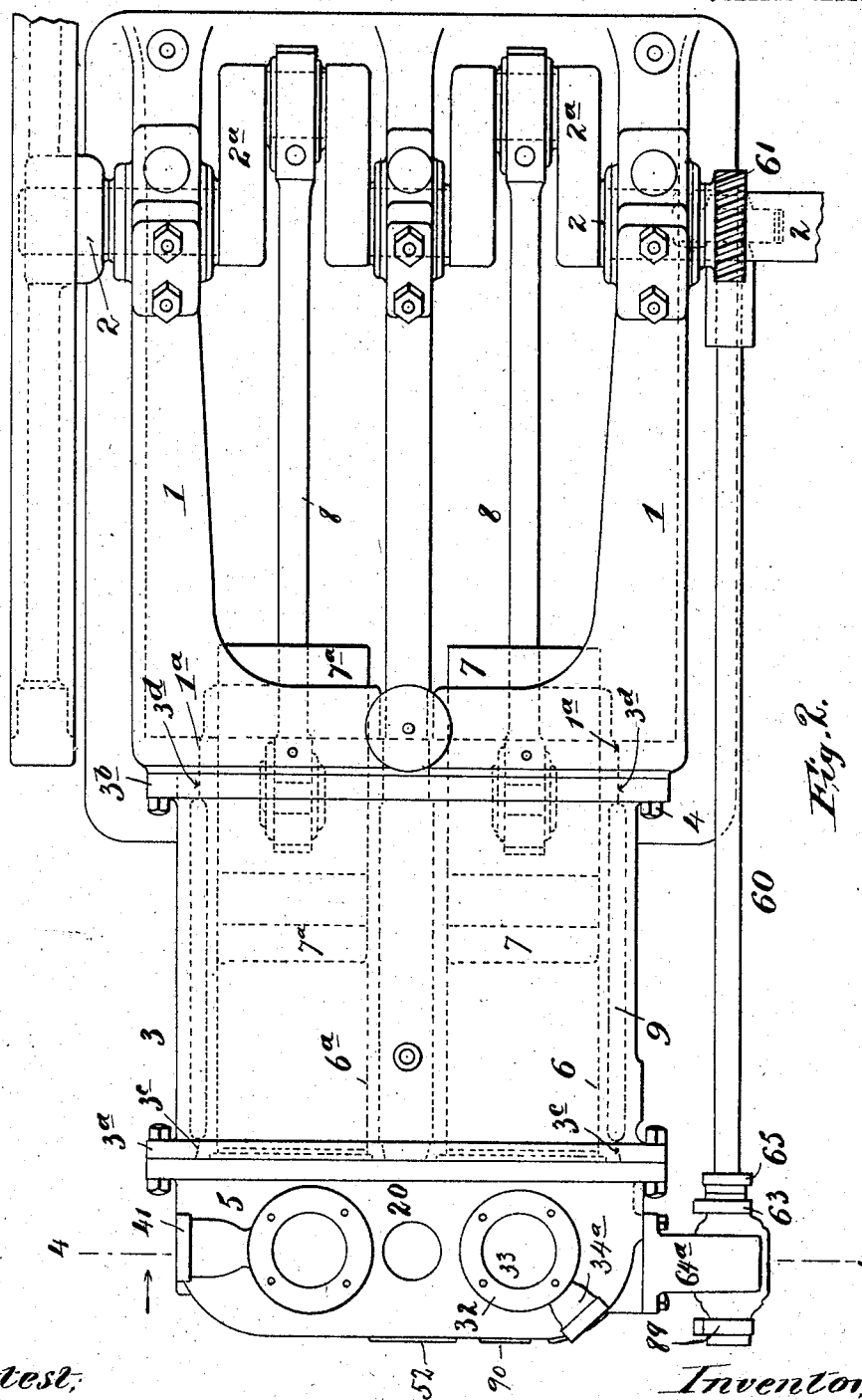

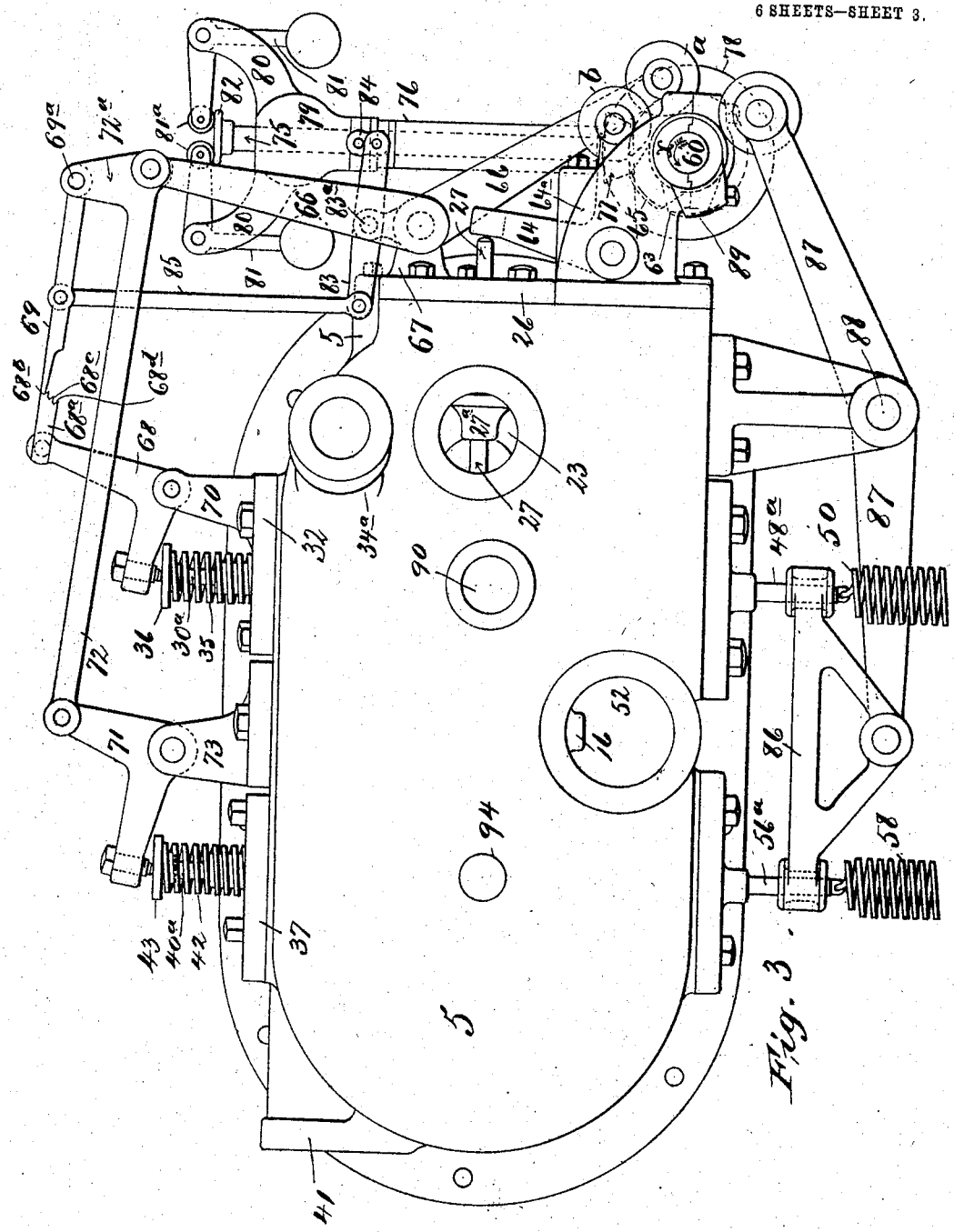

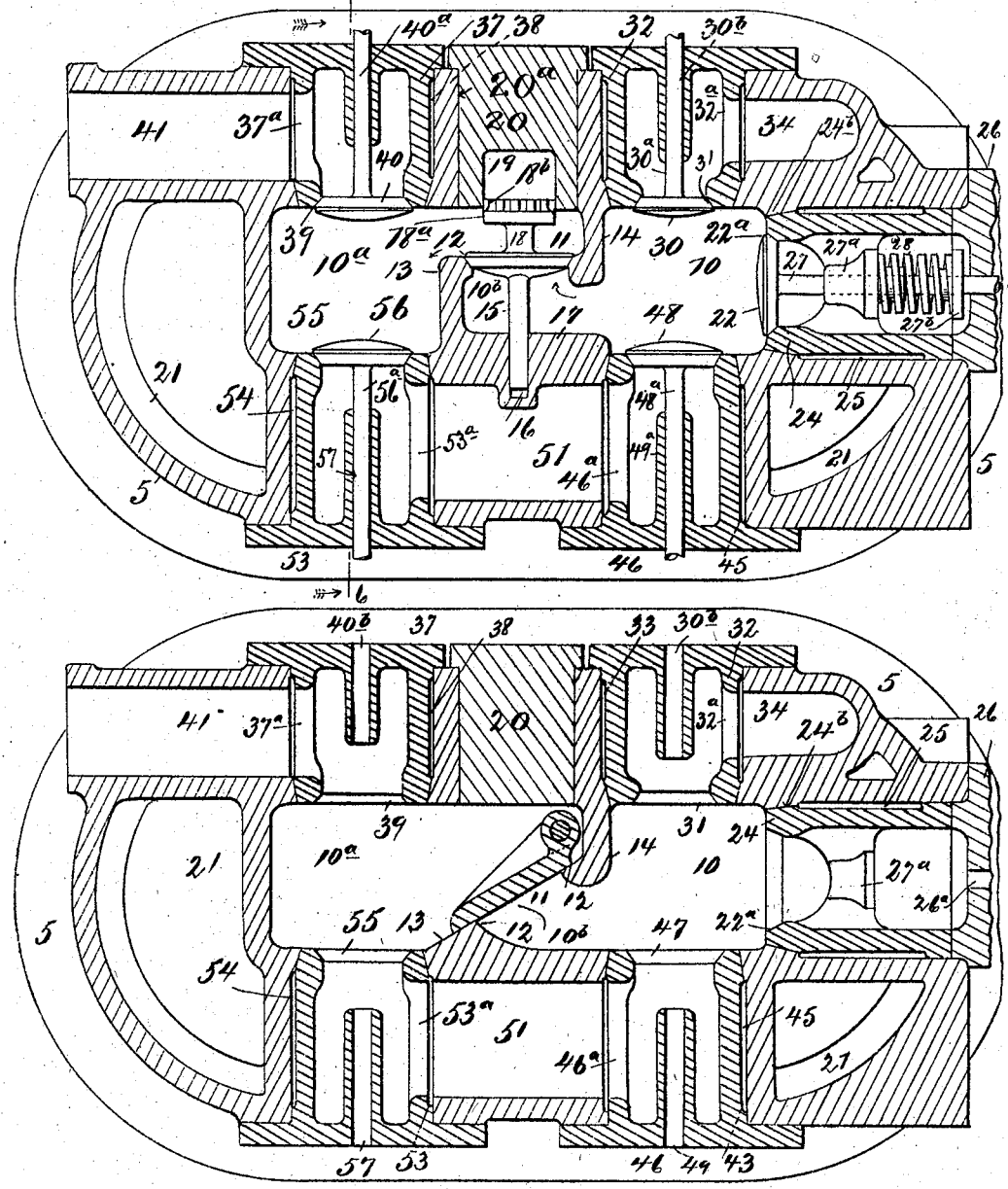

No. 796,106. PATENTED AUG. 1, 1905.
J. L. BOGERT.
INTERNAL COMBUSTION HEAT ENGINE.
APPLICATION FILED JAN. 19, 1897.

6 SHEETS—SHEET 5.

Attest:
C. W. Benjamin
Joseph L. Levy

Inventor,
John L. Bogert,
by T. F. Bourne,
his atty

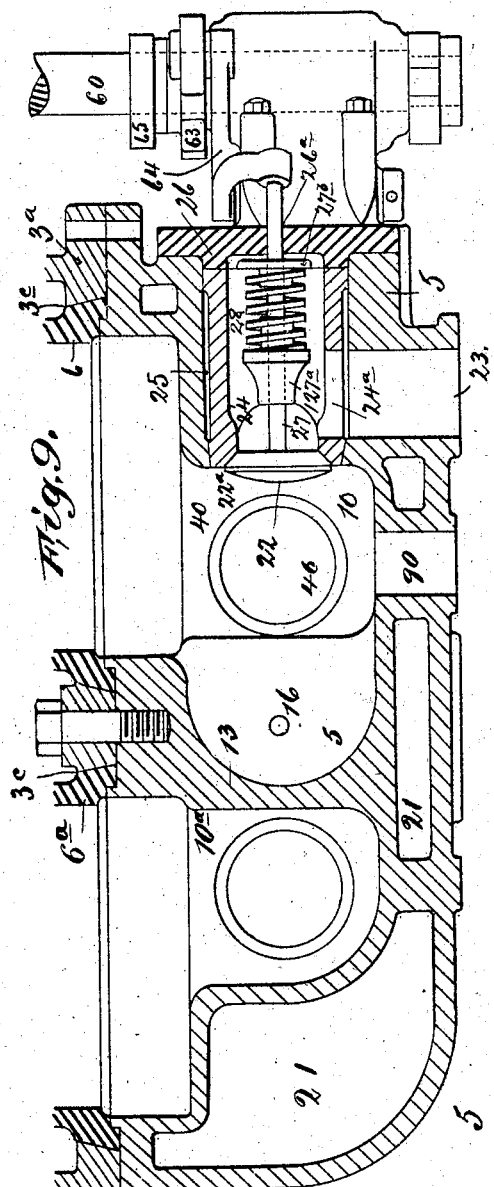

UNITED STATES PATENT OFFICE.

JOHN L. BOGERT, OF FLUSHING, NEW YORK.

INTERNAL-COMBUSTION HEAT-ENGINE.

No. 796,106. Specification of Letters Patent. Patented Aug. 1, 1905.

Application filed January 19, 1897. Serial No. 619,821.

*To all whom it may concern:*

Be it known that I, JOHN L. BOGERT, a citizen of the United States, residing in Flushing, Queens county, New York, have invented a new and Improved Internal-Combustion Heat-Engine, of which the following is a specification.

In order to demonstrate the more clearly the objects and characteristics of my invention, I will briefly set forth what I understand to be the advantages and disadvantages of the various types of internal-combustion heat-engines.

Heat-engines are usually divided into two classes—viz., internal combustion and external combustion. The former class includes gas-engines, oil-engines, vapor-engines, and all machines for transforming heat into work where the heat rendered available by the source of heat is communicated to the molecules of the working fluid without first passing through the walls of the containing vessel. The steam-engine is a representative of the second-mentioned class, the heat of the burning fuel passing first through the plates and tubes of the boiler before it is absorbed by the working fluid—*i. e.*, the vapor of water. Many forms of air-engine belong to this class. In internal-combustion heat-engines to attain the best results the heat should be liberated or made available only when the working fluid is in a condition to immediately absorb and transform it into its work equivalent. Also as in all forms of heat-engine the proportion of heat received from the source of heat which can be transformed into work depends upon the temperature of the heat received with reference to the temperature of the heat rejected or not utilized it follows that the more quickly the available heat is transformed by the working fluid into work the higher may be the initial temperature of this heat without serious loss to the walls of the containing vessel. For this reason internal-combustion heat-engines are theoretically much more efficient heat-engines than external-combustion heat-engines—*i. e.*, temperatures are attained in the former that would quickly destroy the latter. The best known form of internal-combustion heat-engine is one where a mixture of air and coal-gas or air and some hydrocarbon is made use of, both as a source of heat and as a working fluid, the chemical union of the hydrogen and the carbon with the oxygen of the air resulting in the change of the working fluid into carbonic acid, steam, and nitrogen, the increase in available pressure of the working fluid being due to the heat liberated when the said chemical union takes place. The foregoing action takes place in a vessel having expansibility, resistance being offered to the expansion of the chamber by suitable mechanism, so that the overcoming of the resistance during the expansion of the chamber shall be the performance of the desired work. The carbonic acid, water-vapor, and nitrogen at a temperature depending on the efficiency of the heat-engine are then rejected or expelled from the chamber, to be replaced with a fresh mixture of air and hydrocarbon or gas. It was long ago perceived that to obtain satisfactory results the working fluid should possess considerable pressure when the heat was supplied to it, as but a small movement of expansion would then result in the transformation of a large amount of heat into work, work being the product of pressure by distance. The best known heat-engines of this type obtain this initial pressure of the working fluid by compression, either in the same expansible chamber that converts heat into work, as in the well-known "Otto" engines, or by suitable pumps. Theoretically the efficiency increases with the initial pressure of the working fluid; but the pressure resulting from the chemical union of the constituents of the combustible mixture used as the working fluid increases with its initial pressure. When a piston moving in a cylinder is used for the expansible chamber, a point is reached where the pressure resulting from combustion is so great as to cause rapid deterioration of its packing-rings. Therefore pressures much exceeding two hundred pounds per square inch (which results from the use of an initial compression-pressure of fifty pounds per square inch with ordinary coal-gas mixed with the proper proportion of air as the working fluid) are not altogether desirable. Theoretically all the heat should be supplied at the commencement of the stroke of the piston or the beginning of the expansion of the chamber—that is to say, the working fluid should have its pressure fall from the conversion of heat into work and not have its pressure sustained in any manner by the constant addition of heat during the performance of its work. Unfortunately in the present forms of internal-combustion heat-engines when the working fluid is a combustible mixture, whether rich or dilute, it will not part with all its heat at the commencement of the expansion, but will suppress about one-half of the true heat of its combustion, giving it out only as the expansion proceeds and its pressure falls. This "afterburning," as it is called, is responsible for many faults in gas-engines. Frequently the combustion of the working fluid is only complete when the exhaust-valve is opened, and cases are known where there has been enough flame left when the exhaust-valve was closed to ignite the incoming mixture. The pressure at the moment of opening the exhaust-valve is high, (sometimes over fifty pounds per square inch,) and there is therefore a heavy load thrown on the ordinary valve-gearing. The exhaust is necessarily noisy and the temperature of the escaping gases a source of fire risk. By properly weighting the reciprocating parts and regulating the speed of rotation of the crank-shaft a turning effort on the crank-shaft can be obtained as satisfactory as desired without maintaining the pressure during expansion by after-burning.

The object of my invention is to remedy the defects above mentioned as inherent in all internal-combustion heat-engines where the working fluid is also the combustible mixture, principally to substantially consume the fuel long before the expansion is complete, and hence diminish the evil effects of afterburning or slow combustion.

A further object of the invention is to provide certain improved details of construction whereby the beneficial effects above set forth may be obtained.

To these ends I make use of two or more expansible chambers, to one of which a combustible mixture of air and fuel is supplied and to the other or others air is supplied, and said chambers are connected by a passage or passages, so that as soon as the combustible mixture in one chamber is inflamed or before its expansion is complete the burning combustible mixture will have access to the air in the other expansible chamber or chambers through said passage or passages, whereby a portion of the inflamed combustible mixture can expand into a volume of gas, which is an assistant to complete and rapid combustion because of its oxygen, and whereby a much more rapid conversion of the heat into work is effected. In carrying out my invention I have found it advantageous to use as expansible chambers cylinders containing reciprocating pistons, which may be of any desired shape and form and connected with any desired mechanism, provided they move on their expansion-stroke with substantial simultaneousness.

The invention further consists in the novel details of improvement and the combinations of parts that will be more fully hereinafter set forth and then pointed out in the claims.

Reference is to be had to the accompanying drawings, forming part hereof, which illustrate a convenient form of structure for carrying out my invention, and wherein—

Figure 8:
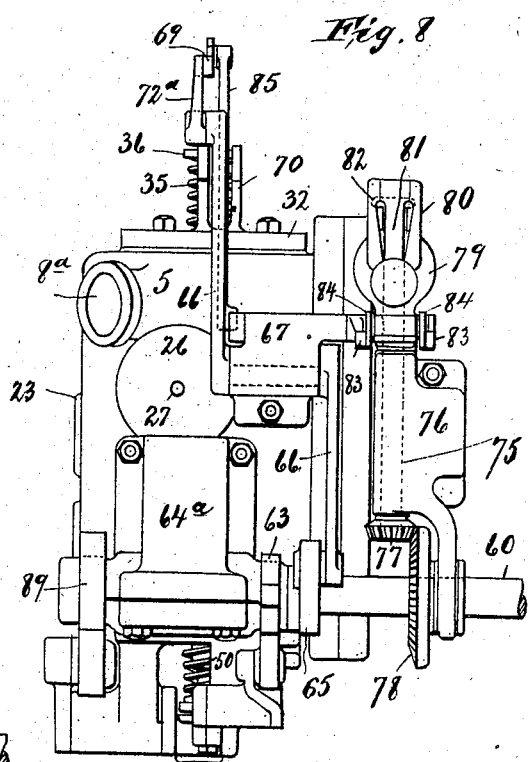

Figure 1 is a side elevation of an internal-combustion heat-engine embodying my invention, some of the working parts being removed. Fig. 2 is a plan view thereof. Fig. 3 is an end elevation, enlarged, looking from the left in Fig. 1, showing valve-operating devices in position. Fig. 4 is a vertical cross-section on the line 4 4 in Fig. 2 looking in the direction of the arrow, showing the gas, air, and exhaust valves, the passage forming communication between the two expansible chambers or cylinders, and a valve for controlling said passage. Fig. 5 is a view corresponding to Fig. 4, (the air, gas, and exhaust valves being removed,) showing modified means for controlling the passage between the expansible chambers. Fig. 6 is a vertical longitudinal section on the line 6 6 in Fig. 4 looking in the direction of the arrow, showing the expansible chamber or cylinder and the contained piston in section, also illustrating the relation of the expansible chamber or cylinder to the passage that connects the two expansible chambers or working cylinders. Fig. 7 is a plan view, enlarged, of the compression end of the engine, showing valve-operating mechanism. Fig. 8 is a side elevation thereof looking in the direction of the arrow in Fig. 7. Fig. 9 is a horizontal section through the compression-spaces of the expansible chambers or cylinders. Fig. 10 is a detail sectional view of modified means for admitting the fuel mixture.

In the accompanying drawings, in which similar numerals of reference indicate corresponding parts in the several views, 1 indicates a suitable frame. 2 is a crank-shaft suitably journaled in said frame, and 3 is a casing, shell, or jacket suitably connected with frame 1, as by bolts 4.

5 is a casting or housing bolted or otherwise connected with part 3 and containing chambers, valves, and other parts, as hereinafter explained.

The part 3, as shown in Figs. 1, 2, 7, and 9, has end plates or flanges $3^a$ $3^b$, which are shown bolted to the parts 1 and 5. The end plates $3^a$ $3^b$ are provided with apertures $3^c$ $3^d$, (see Figs. 2 and 9,) the corresponding apertures $3^c$ $3^d$ being alined, as in Fig. 2. As I contemplate using two expansible chambers or cylinders, the casing 3 is shown provided with two sets of apertures $3^c$ $3^d$, and in the corresponding apertures $3^c$ $3^d$ are located cylinders, liners, or barrels 6 $6^a$, which constitute, with their pistons and the inner walls of casing 5, the expansible chambers or cylinders hereinbefore referred to. These cylinders, liners, or barrels by preference project through apertures $1^a$ in the frame 1. (See Fig. 2.) The cylinders or liners 6 $6^a$, as shown, are open at both ends and contain suitable reciprocative pistons 7 7ª, which are connected by rods 8 with the cranks 2ª of a crank-shaft 2 in suitable manner. It is evident, however, that the pistons may be connected with a single crank. The walls of the casing 3 and of the cylinders or liners 6 6ª are so arranged relatively to each other as to form a space 9 between them, which constitutes a water-jacket for the cylinders. It is thus seen that the two expansible chambers or cylinders 6 6ª are shown as parallel and near together and that the cranks 2ª 2ª are arranged parallel and on the same side of shaft 2, whereby the pistons 7 7ª will have substantial simultaneous movement, or, in other words, so that the pistons will reciprocate with substantial synchronism. However, it is comprehended within the scope of my invention that the expansible chambers may be arranged otherwise relatively to each other, if found desirable. For instance, the expansible cylinders or chambers could be placed end to end or at an angle to each other, the crank or cranks being of course suitably arranged, as in some well-known types of gas-engines.

It is evident that instead of making the casing or jacket 3 and the linings or cylinders 6 6ª in separate parts and securing them together they may be made in a single structure or casting, such as shown in Fig. 6. Furthermore, it will be understood that the cylinders and water-jacket may be made in any other suitable or well-known manner, provided that the cylinders are so placed relatively to the cranks that the pistons can reciprocate with substantial simultaneousness, the purpose of which simultaneous movement of the pistons will more fully hereinafter appear.

It is designed that a mixture of suitable fuel and air shall be compressed, burned, and expanded in one cylinder, as 6, and that air shall be compressed and expanded, in conjunction with some of the burning fuel mixture from said cylinder, in the other cylinder, as 6ª. This portion of the fuel mixture entering cylinder 6ª will act on the air therein, and to properly permit the said portion of the fuel mixture to pass from one expansible chamber to the other said expansible cylinders are connected by a passage. I have illustrated a convenient arrangement of parts as follows: The casting or housing 5 is provided with two interior chambers or cavities 10 10ª, which respectively communicate with the bores of cylinders 6 6ª. (See Figs. 6 and 9.) These chambers 10 10ª are the compression spaces or chambers for the motive fluid of the engine, and while they are shown as located in a separate casting 5 it is evident that the cylinders 6 6ª could be of sufficient length to enable said compression chambers or spaces to be located directly therein, or any other suitable arrangement of compression-spaces for the cylinders 6 6ª can be provided. The working fluid is to be compressed and expanded in chamber 10, and in the other chamber 10ª air is to be compressed and expanded in conjunction with some of the working fluid from chamber 10. It will be understood that the air in chamber or space 10ª is to be isolated as completely as practicable from the fuel mixture in chamber or space 10 until ignition of the fuel mixture in the latter space takes place, whereupon a portion of the burning fuel mixture can have access to the air in the space 10ª before the pistons move to any great degree. For this purpose a passage 10ᵇ is provided between the chambers or compression-spaces 10 10ª. In Figs. 4, 5 the passage 10ᵇ is shown as controllable by means of a valve 11 or its equivalent. The valve for passage 10ᵇ will serve to keep the gas or fuel mixture that enters space 10 from mingling with the air in space 10ª until a change of pressures in the two spaces takes place.

In Figs. 4 and 5 I have shown the passage 10ᵇ as controlled by a puppet-valve 11, adapted to open toward chamber 10ª. The seat 12 for this valve is shown as formed in the walls 13 14, that separate the chambers 10 10ª. Valve 11 is shown in Fig. 4 provided with a depending guide-stem 15, that enters a bore 16 in a wall 17 of chamber 10, and with an upwardly or oppositely extending stem 18, that can enter a bore 19 in a plug 20, fastened in a bore 20ª in casting or housing 5. By preference the stem 18 has an enlargement or head 18ª, which is guided in bore 19, and this head or the bore 19 is provided with one or more ports or notches 18ᵇ, which are so arranged that when the valve is on its seat air can enter the bore 19 above said head from the air-chamber, but when the valve rises the head closes said bore. By this means the air in the bore 19 will be confined as the valve rises and will thus act as a cushion to resist the forcible thrust of the valve in opening when the fuel mixture is ignited in chamber or compression-space 10.

In Fig. 5 I have shown a flap or swinging valve 11 to close against seat 12 and serving to control the passage of fluid from chamber 10 to chamber 10ª. It is evident, however, that any other similar device may be used to control the passage or circulation of air and fuel mixture between chambers 10 and 10ª, so as to confine air only in chamber 10ª until such time as ignition of the fuel mixture in chamber 10 takes place, and the increase of pressure in chamber 10 causes some of the burning fuel mixture to pass into chamber or compression-space 10ª and act on the compressed air therein. The passage 10ᵇ can be arranged in any suitable manner, and more than one of said passages may be used. 21 represents water-spaces in the casting 5, surrounding the compression-spaces 10 10ª, which may be suitably arranged and supplied with water for reducing the temperature of the parts, and, if desired, the walls of the spaces 21 may be coated with some suitable fireproof material to reduce the loss of heat. It will thus be seen that my invention contemplates the use of a passage between the expansion portions of the two chambers or cylinders whether the passage is controllable or not, the controllable passage serving to more perfectly isolate the fuel mixture in one chamber from the air in the other chamber until ignition, while with a non-controllable passage the separation of the fuel mixture and air in said chambers may not be so complete.

I wish it understood that the devices above described are examples of suitable mechanism capable of carrying out my invention, to which I do not limit the invention in any particular, excepting in so far as any arrangement shown may be essential to the practical carrying out of the invention, and, furthermore, it will be understood that the fuel mixture and air may be supplied to and exhausted from the expansible chambers or cylinders and their compression-spaces in any suitable or well-known manner.

In order to demonstrate the practicability of my invention, I have shown an arrangement of parts which may be described as follows: I will first describe how air and fuel may be admitted to compression-space 10 and the corresponding expansible chamber or cylinder 6 and air to the compression chamber or space $10^a$ and the corresponding expansible chamber or cylinder $6^a$ and how the expanded charges may be exhausted therefrom and then the means I have shown for operating the devices by which the above results are obtained. 22 is a valve (see Figs. 4 and 9) which controls an air-passage 23, leading into compression-space 10, said valve being arranged to open inwardly. Valve 22 is shown resting against a seat $22^a$ on a hollow plug 24, that fits in a bore 25 in casting or housing 5. Plug 24 has an opening $24^a$, (see Fig. 9,) that leads to opening 23, the latter opening communicating with the air-supply in suitable manner. Plug 24 is shown held in place by a cap or flange 26, secured on casting 5, the inner end of said plug abutting against a wall $24^b$ in casting 5. The stem 27 of valve 22 is shown guided in a bore in a bridge $27^a$ in plug 24, and when the valve is to be opened by mechanical agencies the stem 27 may project through an aperture $26^a$ in cap 26; but if the valve is to be operated by suction this need not be so. 28 is a spring shown coiled around stem 27 and acting against bridge $27^a$ and against a projection or shoulder $27^b$ on stem 27, this spring serving to hold valve 22 to its seat. While the spring 28 is shown located within plug 24, it is evident that it may be placed on the outside of cap 26 in any suitable manner.

The means to admit gas or fuel to the compression-space 10 is shown arranged as follows: 30 is a valve shown resting against a seat 31 on a hollow plug 32 in the casting or housing 5 and communicating with compression-space 10. (See Figs. 4 and 5.) The plug 32 is provided with an opening $32^a$, that communicates with a channel 34 in the casting or housing 5, which leads to an outlet $34^a$ to be connected with a gas or fuel supply pipe. The stem $30^a$ of valve 30 is shown guided in a bore $30^b$ in plug 32, and said stem projects therefrom and is shown surrounded by a spring 35, (see Fig. 3,) which serves to hold the valve to its seat. The spring in Fig. 3 is shown acting against a projection or head 36 on stem $30^a$ and against plug 32. It will be evident that valve 30 and its parts may be arranged similarly to valve 22 and its parts, or valve 22 could be arranged substantially in accordance with valve 30. It is also obvious that either or both of these valves could be arranged in any other suitable manner. Means for operating these valves will be described hereinafter.

It is evident that instead of using two separate valves to admit air and fuel or gas to compression-space 10 a single valve can be used for the purpose. Such an arrangement is shown in Fig. 10, wherein the valve 30, spring 35, and hollow plug 32 are substantially the same as that described with reference to the gas-valve of Figs. 4 and 5, the plug 32 having both openings $23^a$ and $32^a$ communicating with the gas-channel. When valve 36 moves from its seat, air and fuel will both be admitted to compression chamber or space 10. It is obvious that the arrangement for admitting air and fuel to the compression chamber or space 10 by one valve may be suitably altered, if desired.

Air may be admitted to the air-compression space $10^a$ by any suitable means, such as a valve that operates either by suction or differential pressures or by mechanical agency. A valve may be used arranged similar to valve 22 or valve 30. (Shown in Fig. 4.) I have shown a valve for the purpose arranged similar to valve 30, which may be particularized as follows: 37 is a hollow plug located in a bore 38 in casting 5 and having a seat 39, upon which a valve 40 rests, plug 37 having an aperture $37^a$, that communicates with a channel 41 in casting or housing 5, through which channel and the hollow plug air can pass to compression-chamber $10^a$. The stem $40^a$ of valve 40 is guided in a bore $40^b$ in plug 37, and said stem in Fig. 3 is shown projecting through a bore in plug 37 and surrounded by a spring 42, which operates against plug 37 and against a projection or head 43 on stem $40^a$ to hold valve 40 to its seat. Means for operating valve 40 will be described hereinafter. It may be stated here, however, that the air-valve 40 and the gas and air valve or valves for compression chamber or space 10 are to be so opened that air will be drawn into compression-chamber $10^a$ and cylinder $6^a$ substantially simultaneously with the entrance of fuel and air into compression-chamber 10 and cylinder 6 and that the air and the fuel and air mixture are to be compressed in their respective compression-spaces with substantial simultaneousness. With a controllable passage between spaces 10 and $10^a$ none of the air in compression space or chamber $10^a$ can pass to compression-space 10.

Means to permit the spent charges to be exhausted from the expansible chambers or cylinders and their respective compression-spaces may be provided in any well-known or suitable manner. A separate outlet may be provided for each compression-space. (See Figs. 3, 4, 5.) I have shown exhaust-outlets for the compression-spaces arranged as follows: In the casting or housing 5, communicating with the compression-space 10, is a bore 45, Figs. 4 and 5, in which is located a hollow plug 46, having a seat 47 to receive a valve 48, which opens inwardly. The stem $48^a$ of this valve is guided in a bore 49 in plug 46 and projects therefrom so as to be operated by suitable mechanism, a spring 50 connected with said stem (see Fig. 3) serving to keep the valve 48 upon its seat. While the plug 46 could have an opening in its outer wall leading directly to the open air, I have shown an opening $46^a$ in one side wall, which opening leads to a channel 51 in the casting or housing 5, the channel 51 in turn leading to an opening 52 in the back plate or wall of said casting, through which the exhausted products of combustion can be carried away. (See Fig. 3.) The exhaust products of combustion are conducted away from compression-space $10^a$ by means similar to those just described, a plug 53 being located in a bore 54 in casting 5, said plug having a seat 55 for a valve 56, the stem $56^a$ of which valve is guided in a bore 57 in plug 53, from whence it projects, and is connected with a spring 58, Fig. 3, to keep the valve upon its seat, (the outer end of said spring being connected to the floor or other suitable place.) An opening $53^a$ in the side wall of the plug 53 leads to chamber 51 for the escape of the exhaust products. Instead of an opening $53^a$ in the side wall the plug 53 could have an opening in its outer wall.

It is obvious that the valve arrangement 22 to 28 (shown in Fig. 4) could be used for the exhaust, if preferred, or that shown in Fig. 10, having channel $23^a$ connected with compression-space 10, and channel $32^a$ connected with compression-space $10^a$, or any other suitable arrangement may be employed for the purpose.

The devices I have shown for operating the valves are as follows: 60 is a shaft journaled in suitable bearings carried by the engine and rotated by the crank-shaft 2 through the medium of suitable gearing 61 62, the ratio of which gearing may be such that shaft 60 will make one revolution to two rotations of shaft 2. The shaft 60 carries suitable cams to operate the valves. To operate the air-valve 22, I have shown a cam 63 on shaft 60, which is adapted to actuate a lever 64, pivotally supported by the engine, as on a bracket $64^a$, which lever is adapted to push stem 27 of valve 22 inwardly to admit air to compression-space 10. (See Fig. 9.) 65 is a cam on shaft 60, adapted to operate a lever 66, that is shown pivotally carried by a bracket 67, supported by casting or housing 5. The lever 66 is adapted to actuate gas-valve 30 and air-valve 40 by operating upon their stems $30^a$ and $40^a$. (See Fig. 3.) For this purpose I have shown lever 66 as connected with a lever 68 by a link or rod 69, lever 68 being pivotally carried on a bracket 70, supported by housing 5, and the lever 66 is shown connected with a lever 71 by a rod 72, the lever 71 being shown pivoted on a bracket 73, carried by housing 5. Lever 68 is shown acting upon stem $30^a$ and lever 71 upon stem $40^a$, whereby valves 30 and 40 may be opened with substantial simultaneousness. The cams 63 and 65 will be placed upon shaft 60 with such relation to each other that valves 22, 30, and 40 will operate at the proper times to admit air and fuel to compression chamber or space 10 and air only to compression chamber or space $10^a$. Rod 72 is shown pivotally connected with levers 66 and 71, and said rod is also shown provided with an extension $72^a$, to which link 69 is shown pivoted at $69^a$. (See Fig. 3.)

In order to regulate the admission of gas to compression-space 10 in accordance with the speed of rotation of shaft 2, I have shown the rod 69 as detachably connected with lever 68. For this purpose lever 68 is shown provided with an arm or extension $68^a$, having notches $68^b$ $68^c$ $68^d$, in which the end of rod or link 69 is adapted to enter, (see Fig. 3,) said notches being shown at varying distances from pivot $69^a$. Rod or link 69 thus constitutes a picker adapted to move lever 68 more or less or not at all, according to its position relatively to lever 68. The position of link or picker 69 relatively to arm $68^a$ or lever 68 is regulated by a governor operated from camshaft 60, the arrangement I have shown for this purpose being as follows: 75 is a vertical shaft shown journaled in bearings in a bracket or support 76, carried by the engine, the lower end of said shaft carrying a gear 77, that meshes with a gear 78, carried by shaft 60, whereby shaft 75 is rotated in accordance with the speed of shaft 60. 79 is a head mounted upon shaft 75 so as to slide freely thereon and connected therewith so as to be rotated thereby, as by a spline or feather. Head 79 has upwardly and oppositely extending arms 80, to which are pivoted governor-arms 81, shown composed of bell-crank levers having weighted outer ends and rollers 81ᵃ at the inner ends, which bear upon a head 82 at the upper end of shaft 75, whereby as the speed of shaft 75 varies the weighted ends of arms or levers 81 will move outwardly and inwardly more or less, thereby causing head 79 to rise or descend accordingly. This vertical movement of head 79 is utilized to regulate the admission of gas to compression chamber or space 10 through the medium of a lever 83, connected at one end with sliding head 79 and at its other end with link, rod, or picker 69. For this purpose I have shown the lever 83 as pivotally carried by bracket 67, as at 83ᵃ, one arm of said lever being pivotally connected by a link 84 with sliding head 79, the other arm of said lever being pivotally connected with picker 69 by a rod 85. With the arrangement above described when the engine is operating at normal speed head 79, through link or picker 69 and lever 66, will open valve 30 to admit the mean charge of gas to compression-chamber 10. If the speed increases a certain amount, head 79 will rise proportionately, thus causing lever 83 to draw down link or picker 69, and thereby remove it from notch 68ᶜ, causing it to come in line with notch 68ᵈ, whereby lever 68 will be given less than the normal movement, thus permitting less gas to enter compression-space 10, or, in other words, reducing the supply of fuel to said space. Should the speed of the engine become greater, head 79 and lever 83 will act to draw link or picker 69 entirely out of line with arm 68ᵃ of lever 68, thereby preventing lever 68 from operating valve 30, thus entirely cutting off the supply of fuel to compression chamber or space 10 until the engine slows down to about its proper speed. This cutting off or reducing the supply of fuel, however, has no effect of stopping the supply of air to compression-space 10ᵃ or of air to space 10 when separate air and fuel valves are used for space 10, as in Fig. 3. In Fig. 3 I have shown picker 69 in notch 68ᵇ, which is the position of the parts when the engine is running below the normal speed, whereby the maximum proportion of fuel is admitted to space 10 during charging stroke. It is evident that other means may be employed for regulating the supply of fuel to the compression-space 10 in accordance with the speed of the engine.

While the devices shown and described enable the substantial simultaneous opening of valves 22, 30, and 40, the parts can be so arranged as to "scavenge" the compression-space 10 before the fuel is admitted, and to accomplish this scavenging it is merely necessary to so adjust the cams 63 and 65 relatively to each other that valve 22 will be opened slightly before valves 30 and 40. In this event air rushing into compression-space 10 will be drawn through passage 10ᵇ into space 10ᵃ past valve 11, whereby spent products of combustion in chamber or space 10 that may not have been exhausted therefrom on the exhaust-stroke of the piston 6ᵃ will also pass to space 10ᵃ, thus reducing the deleterious effect that the spent products (especially the carbonic-acid gas) might have on the new charge of fuel mixture. As soon as all the supply-valves are opened the pressures within spaces 10 and 10ᵃ will be equalized, (whereupon valve 11 will close passage 10ᵇ to prevent unburning fuel from entering space 10ᵃ.)

The valves 48 and 56 are to be opened with substantial simultaneousness when two exhaust-valves are used to permit rapid exhaustion from the cylinders and compression-spaces, and for this purpose I have shown a yoke 86, Fig. 3, connecting the valve-stems 48ᵃ and 56ᵃ, which yoke is pivotally connected with a lever 87, that is pivotally supported by a bracket 88, carried by the casting or housing 5. (See Fig. 3.) Lever 87 is actuated by a cam 89, carried by shaft 60. It will be understood that the positions of cams 63, 65, and 89 relatively to levers 64, 66, and 87 will be such that after cam 89 has opened valves 48 and 56 (or valve 56, if only one exhaust-valve is used) to permit exhaustion from compression-spaces 10 and 10ᵃ it will move from said lever, and cams 63 65 will then act on levers 64 66 to open the valves that admit the charges to the compression-spaces 10 and 10ᵃ and the expansible chambers or cylinders 6 6ᵃ. The positions of the cams on shaft 60 (shown in Fig. 3) are such that expansion in the cylinders is about to take place, it being understood that shaft 60 in the illustration given rotates in the direction of the arrow *x* in Fig. 3.

90 indicates an opening leading into the compression and expansion chamber or space 10, in which any well-known or suitable sparker or igniting device may be placed to ignite the charge of fuel mixture in the compression-space 10. In Fig. 1 I have shown a hot-tube arrangement for igniting the charge, wherein 91 is a tube leading to space 10 and surrounded by a non-conducting casing 92, the tube 91 being heated by a Bunsen burner 93. This arrangement is the same as that known as "Siemens' tube method." In Fig. 3 I have shown provision at 94 for an opening that may lead through a wall of compression-space 10ᵃ, to which opening any suitable "self-starter" may be applied whereby to give an initial stroke or strokes to the piston 7ᵃ. It is furthermore evident that a quieting-chamber of any suitable construction may be connected with the exhaust.

The method of transforming heat into available energy and the operation of the parts illustrated may be described as follows: Let it be supposed that the pistons 7 7ᵃ are at the compression ends of the cylinders 6 6ᵃ, (see Fig. 6,) that the cylinders and their compression-spaces 10 10ᵃ have been exhausted as much as possible, that cam 89 has passed from lever 87 to allow the exhaust valve or valves to close, and that cams 63 and 65 are in position to actuate levers 64 and 66 to open valves 22, 30, and 40. Shaft 60 now rotates to cause cams 63 and 65 to open valves 22, 30, and 40, while at the same time pistons 7 and $7^a$ advance, whereupon air and fuel will be drawn into compression-space 10 and cylinder 6 by piston 7, and air will be drawn into compression-space $10^a$ and cylinder $6^a$ by piston $7^a$. When the pistons reach the limit of their forward strokes, cams 63 and 65 will allow the air and fuel valves to close, and upon the return stroke of the pistons the fuel mixture will be compressed in chamber or space 10 by piston 7, and the air will be compressed in chamber or space $10^a$ by piston $7^a$ substantially simultaneously, owing to the substantial simultaneous movement of said pistons. The charge in compression-space 10 is next ignited, whereupon immediate inflammation and rapid expansion of the fuel mixture take place and the pressure therein will quickly rise. Now, owing to the increased pressure in chamber 10, a portion of the burning fuel mixture will rush through passage $10^b$ and open valve 11 and enter compression-space $10^a$, where it will attack the compressed air, causing said air to expand, and thus increase the pressure in cylinder $6^a$, the burning fuel mixture which entered said space $10^a$ likewise expanding. The effect of all this is that the inflamed fuel mixture has an opportunity to expand greatly at the beginning of the stroke of piston 7 and that portion of it which enters space $10^a$ not only acts upon piston $7^a$ in the ordinary manner, but it causes the compressed air therein to expand and press on the piston $7^a$, while at the same time said air serves to cause more rapid combustion of the burning fuel mixture. As the fuel mixture thus has an opportunity to expand greatly at the beginning of the stroke of its piston, owing to its ability to pass to the auxiliary expansion-chamber, and thus have a greater space in which to expand compared with its initial volume, the fuel mixture will be practically consumed long before the end of the stroke, its pressure meanwhile rapidly decreasing, owing to the rapidity with which the heat is converted into work, and very little pressure will remain in the cylinders at the moment of exhaust, the heat of the burning fuel having been converted into work, so that little loss occurs from slow burning and substantially none through unconsumed fuel remaining in the cylinders. There is thus practically no suppression of heat, owing to the ability of the fuel mixture to expand largely at the commencement of the forward strokes of the pistons, and the pressure of the working fluid falls rapidly from the commencement of the strokes, so that the so-called "afterburning" does not take place. Cam 89 will now have reached such a position that as the pistons move back lever 87 will be moved to open the exhaust. As shaft 60 makes one complete revolution to two rotations of shaft 2, it will be understood that the valves will be properly operated to permit drawing in of the fuel and air, compression, expansion, and exhaustion.

The method of utilizing fuel in a heat-motor may be more briefly stated to consist in separately compressing a volume of air-and-fuel mixture and a volume of air, in then igniting said fuel mixture and causing a portion of the burning fuel mixture to mingle with said compressed air, and in simultaneously expanding and burning the fuel mixture and expanding the compressed air under the influence of the burning expanding fuel mixture which attacks it. Thus a higher efficiency is insured, in that the burning fuel mixture is given an opportunity to expand after inflammation more rapidly than its chamber and the expansion of the compressed air under the influence of the heat from the burning fuel increases the work or power developed by the engine. An internal-combustion heat-engine operated in accordance with my invention has greater efficiency for a given quantity of fuel than the present types of internal-combustion heat-engines known to me, owing to the fact that a much larger amount of heat of the burning fuel is converted into work without serious loss from slow burning, beside the work performed by the expansion of the compressed air under the influence of the burning fuel mixture.

It will be apparent that when the combustion-space 10 is scavenged by the opening of valve 22 and the consequent passage of spent products of combustion therefrom into space $10^a$ before fuel is admitted to space 10 such action assists the combustion of the fuel mixture in space 10 and cylinder 6 without the necessity of losing a stroke of the piston to effect the scavenging, as has been done in certain gas-engines. While the air and gas admission valves can operate automatically, if preferred, it is evident that valve 22 should be opened mechanically when the above-mentioned scavenging action takes place to insure its opening previously to the others and even while the exhaust-valve is not closed, as in the well-known "Crossley-Otto" scavenging engine.

By using a comparatively rich mixture of air and gas or vapor in the combustible-mixture cylinder 6 the slight dilution occasioned by the additional air allowed to enter it before the entrance of gas or vapor will not interfere with the rapid ignition desired.

I am aware that two or more cylinders have been used in many gas-engines with both separate and tandem trunk-pistons; that mechanism has been employed to cause these cylinders or expansible chambers to enlarge and contract together, (notably in the Sturgeon engine;) that in many internal-combustion heat-engines two expansible chambers are employed having a connecting-passage, as in the well-known "Acme" engine. I am also aware that some inventors have contemplated the aftermingling of the burned gases with compressed air, as in the gas-engine of Root in England.

The relative sizes of the volumes of the air-and-fuel-mixture cylinders may depend upon the amount of compression and the calorific value of the gas or vapor employed as fuel. I use the term "vapor" in contradistinction to "gas," because in many oil-engines the fuel is a liquid at ordinary temperatures and is often mixed with air in the form of spray or mist when introduced into the cylinder. I contemplate using in my invention any suitable fuel, whether in the form of dust, powder, spray, mist, or permanent gas. For this reason I have shown no devices for the preparation of the fuel, as I contemplate using any desirable device now known in the art. A hot tube either with or without a timing-valve, an electric spark or arc formed at the proper moment, an incandescent filament, access to which is obtained through a slide or valve at the proper time, or any of the suitable known means for igniting the charge in a gas or oil engine may be used with my invention. Even where, owing to the use of rich combustible mixtures, the inflammation approaches the speed of an explosion-wave, shock on the parts is relieved by the cushion of compressed air in the air-cylinder receiving the blow. The greater the speed of the engine—that is, the more rapid the reciprocations of the pistons—and the heavier the reciprocating parts the less will be the pressure on the crank-pins during the first half of the working stroke. Hence by properly adjusting the constructive details the pressure on the crank-pins may be rendered as uniform as necessary, even when, as in my invention, a much more rapid fall of pressure takes place than in the cylinder of an ordinary gas-engine. By constructing an engine embodying my invention in which the pistons move in opposite directions the reciprocating parts may be balanced.

Any internal-combustion heat-engine similar in arrangement of cylinders to the Sturgeon, Atkinson-Differential, Trent, Fawcett, Acme, Adam, Daimler, &c., can be equipped with my invention. I therefore do not limit my invention to the constructive details or the arrangement shown in the drawings, as it is obvious that they may be altered or varied without departing from the spirit of my invention.

Having now described my invention, what I claim is—

1. In an internal-combustion heat-engine the combination of two cylinders having a connecting-passage, means to admit fuel mixture into one of said cylinders, means to admit a gas capable of sustaining combustion into the other cylinder, and means operated by difference of pressure between the two cylinders to permit burning fuel to pass from one cylinder to the other, substantially as described.

2. In an internal-combustion heat-engine, the combination of two cylinders having a connecting-passage, means to admit fuel mixture to one of said cylinders, means to admit a gas to the other of said cylinders, means to isolate the fuel mixture from said gas until the fuel mixture is inflamed and said means being arranged to operate by difference of pressure in said two cylinders to permit the commingling of said gas with the burning fuel mixture upon inflammation of said mixture, substantially as described.

3. In an internal-combustion heat-engine the combination of two cylinders having a controllable connecting-passage arranged to be operated by different pressures in said cylinders, means to admit a combustible fuel mixture into one of said cylinders, and means to admit a gas capable of sustaining combustion into the other cylinder, substantially as described.

4. In an internal-combustion heat-engine, the combination of two cylinders having a connecting-passage, pistons in said cylinders, means connected with said pistons whereby they will move simultaneously, and a valve controlling said passage and arranged so that motion through said passage can be but in one direction, substantially as described.

5. In an internal-combustion heat-engine, the combination of two cylinders having a passage connecting the compression-spaces of said cylinders, a valve in said passage arranged to operate only upon a preponderating pressure arising in one cylinder over that in the other, pistons in said cylinders, and mechanism to insure the simultaneous travel of said pistons, with means to admit a combustible mixture to one cylinder, a valve to admit air to the other cylinder, and means to inflame the combustible mixture, substantially as described.

6. An internal-combustion heat-engine comprising two cylinders having a connecting-passage, in one of which cylinders a combustible mixture may be isolated and in the other air, a gas-valve, an air-valve and an exhaust-valve, and a valve between said cylinders operated by difference of pressure in said cylinders, substantially as described.

7. An internal-combustion heat-engine comprising two cylinders having a connecting-passage, pistons in said cylinders, mechanism to insure the simultaneous travel of said pistons, means to admit air and fuel into one cylinder, an air-valve communicating with the other cylinder, an exhaust-valve communicating with the latter cylinder, and a valve controlling the passage between said cylinders and arranged to be operated by differential pressures in said cylinders, substantially as described.

8. An internal-combustion heat-engine comprising two cylinders having a connecting-passage controlled by a valve operated by pressures differing on its two sides, pistons in said cylinders, mechanism to insure simultaneous travel of said pistons, means to admit air and fuel into one cylinder, an air-valve communicating with the other cylinder, and an exhaust-valve communicating with each cylinder, substantially as described.

9. An internal-combustion heat-engine comprising two cylinders having a connecting-passage, a check-valve in said passage to open by a preponderating pressure in one cylinder, pistons in said cylinders, mechanism to insure simultaneous travel of said pistons, valves to admit air to one cylinder and a fuel mixture to the other cylinder, an exhaust-valve communicating with one of the cylinders, mechanism to operate said valves, and governing mechanism arranged to limit or suppress the supply of fuel periodically while supplying equal quantities of air to the air-cylinder at each stroke, substantially as described.

10. The combination of a casting or housing having two cylinders and a connecting-passage provided with a valve-seat, and a bore or recess 19, with a valve to close against said seat and having a portion adapted to enter said bore or recess, said bore having an opening leading thereto to be closed by the movement of the valve, whereby a cushion of air will resist the movement of the valve, substantially as described.

Signed at New York city, in the county of New York and State of New York, this 16th day of January, A. D. 1897.

JOHN L. BOGERT.

Witnesses:
T. F. BOURNE,
F. LEVY.